W. H. COLE.
SYSTEM OF ELECTRICAL DISTRIBUTION.
APPLICATION FILED OCT. 31, 1913.
1,152,881. Patented Sept. 7, 1915.
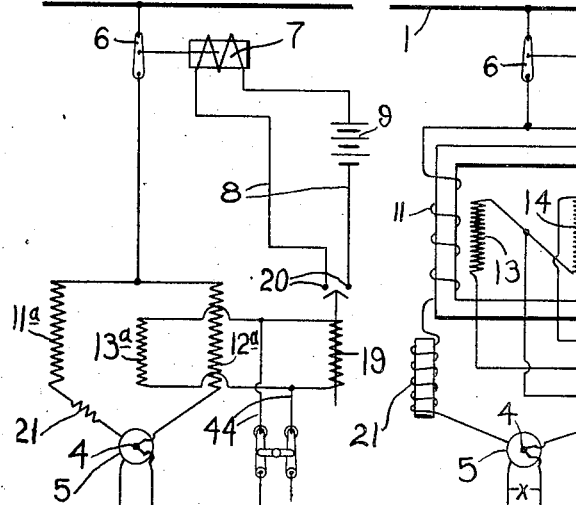
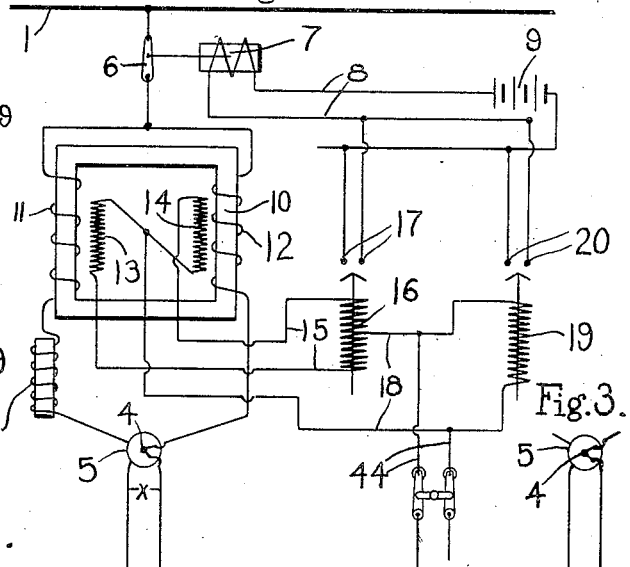
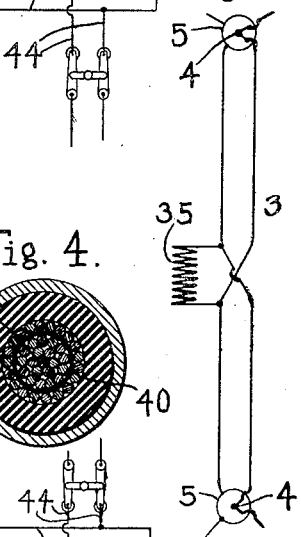
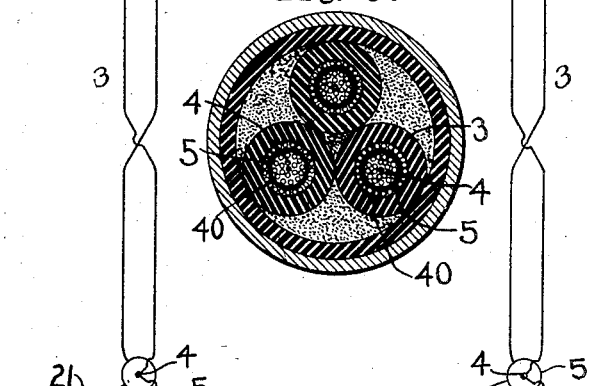
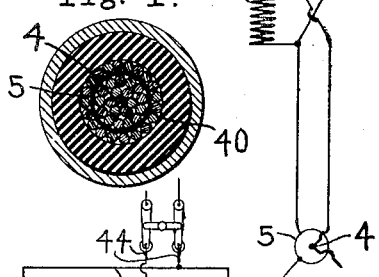
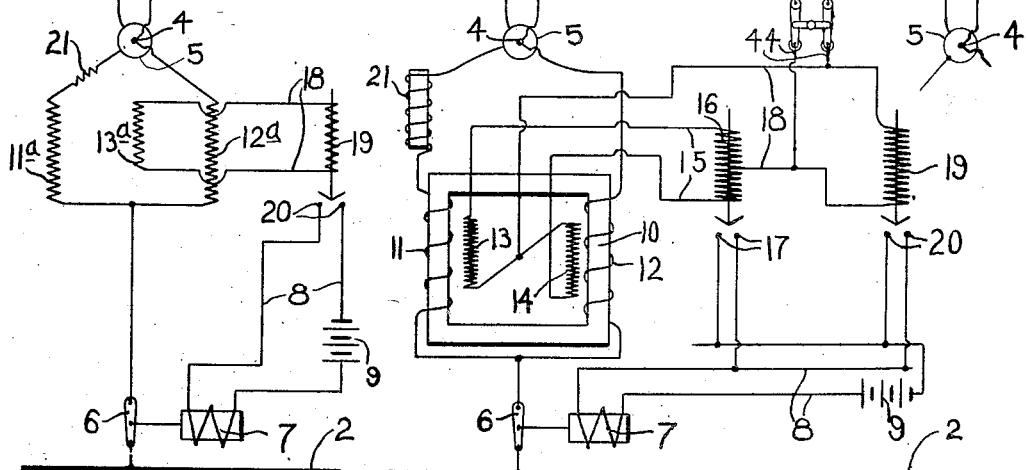
Witnesses.
J. Morrill Fuller
William E. Gagen
Inventor.
William H. Cole,
by Heard Smith & Tennant
Atty's.

UNITED STATES PATENT OFFICE.

WILLIAM H. COLE, OF WALTHAM, MASSACHUSETTS.

SYSTEM OF ELECTRICAL DISTRIBUTION.

1,152,881.  Specification of Letters Patent.  Patented Sept. 7, 1915.

Application filed October 31, 1913. Serial No. 798,594.

*To all whom it may concern:*

Be it known that I, WILLIAM H. COLE, a citizen of the United States, residing at Waltham, county of Middlesex, State of Massachusetts, have invented an Improvement in Systems of Electrical Distribution, of which the following description, in connection with the accompanying drawing, is a specification, like characters on the drawing representing like parts.

This invention relates to systems of electrical distribution and particularly to systems in which the feeding conductors are longitudinally divided and normally operated with the several parts or divisions of each conductor connected in parallel.

The objects of the invention are to provide means for isolating any conductor from the system upon the occurrence of a fault of any nature which results in unbalanced current conditions in the conducting members of said conductor, whether said fault is simply a short circuit or fault contact between the members of a longitudinally-divided conductor, or a grounded conductor, or a conductor involved in a short circuit with another conductor, or an open-circuited conductor member, or any combination of such faults; and to provide other improvements in and relating to electrical-distributing systems, all as more fully hereinafter described and pointed out in the claims.

Referring to the drawings in which I have illustrated some embodiments of the invention which disclose the principle thereof, Figure 1 is a diagrammatic view showing two separated distributing or receiving points in a system of electrical distribution and a divided conductor embodying my invention connecting said points; Figs. 2 and 3 show different embodiments of the invention; Fig. 4 is a sectional view of a divided conductor embodying my invention; Fig. 5 is a similar view of a three-conductor cable made from conductors such as shown in Fig. 4.

Figs. 1, 2 and 3 of the drawings show diagrammatically a single divided conductor 3 extending between two receiving or distributing stations which are indicated generally by the two buses 1 and 2. These may be two stations forming a part of any of the known types of electrical distribution systems, such as ring, radial, or tandem systems of feeding conductors, or any combination thereof. While one conductor only is shown, any number may be used, depending upon the number of phases employed.

As stated above, the conductor 3 is a divided conductor, by which I mean a conductor divided longitudinaly into two or more separate conducting strands or legs which are separated from each other by insulation. The several conducting members of this conductor are connected in parallel and as a result a comparatively light insulation between said members is sufficient. The divided conductor herein shown has one conducting member inclosed in or shrouded by the other. These two conducting members are designated 4 and 5, respectively, the member 4 being situated within and surrounded by the member 5, as seen in Fig. 4. Said members are separated by a comparatively light insulation 40. These two conducting members are arranged in parallel electrically and are connected at their ends to the buses through the switches 6 so that with the above described arrangement there will normally be the same current flow in each member of the conductor provided the impedance of the two members is the same. In practice, however, the impedance under load conditions may be greater in one member than in the other, for instance, the cross-sections may not be exactly the same in both members, the heating will differ under load conditions and the self induction may be unequal under different load conditions. Whenever the impedance in the two members does differ from any cause, the current flow will be correspondingly different.

For reasons which will later appear it is desirable that provision should be made for maintaining substantially equal impedances in each current path so that under normal load conditions the current will divide equally between the two current paths. To accomplish this I propose to transpose said conducting members at one or more points along their length by connecting the outer member at such points to the inner member and vice versa. With this construction each current path is partially in the outer member and partially in the inner member, and by making the proper transpositions the same length of the inner and outer members can be placed in each current path, thereby balancing their possible unequal characteristics and making the impedance in both paths the same. This transposition of the conducting members has the further advantage that in coöperation with the selector impedances, presently to be described, it insures the operation of the apparatus to isolate the conductor from the system whenever a fault occurs closely adjacent to a bus, all as will be presently described.

In the drawings I have shown one transposition at substantially the central point of the conductor so that each current path is through the outer conducting member for half the length of the conductor and then through the inner conducting member for the other half of the length of the conductor. Each current path is thus made up of substantially equal lengths of outer and inner conducting members thereby balancing any difference of impedance that may exist between the individual conductor members.

My invention also includes means for operating the switches 6 thereby to isolate the conductor from the system whenever a fault contact occurs between the two members of a divided conductor carrying current, which means will also operate whenever a fault of any other nature occurs that causes an abnormal current flow sufficient to disturb the current balance in the divided conductor. Each switch is herein shown as operated by a trip coil 7 in a circuit 8 which is supplied with current from a battery 9 or other source of supply. Means are provided for closing this circuit 8 whenever a fault occurs and the means herein shown for this is of the balancing transformer type. The transformer illustrated in Fig. 1 comprises a magnetic core 10 on one arm of which is wound a primary coil 11 in one of the conductor members and on the other arm of which is wound a primary coil 12 in the other conducting member. The two windings 11 and 12 are so arranged that when current is flowing in both windings in the normal direction the magnetic flux is compelled to complete its circuit through the air thus in effect causing the transformer to operate as a transformer of the open magnetic circuit type, while when the current is reversed in one primary coil with respect to the current in the other, the transformer becomes of the closed magnetic circuit type. The advantage of this type of transformer will be referred to hereinafter.

The primary 11 has associated therewith a secondary coil 13 and the primary coil 12 has associated therewith a secondary coil 14. These two secondary coils 13 and 14 are connected in series in a circuit 15 having therein an overload circuit-closing relay 16 adapted to close the circuit 8 at contact 17 when the relay is operated. The secondary coils 13 and 14 are also connected in parallel through a circuit 18 which has a fault relay 19 therein that is also adapted to close the circuit 8 at contact 20. A device of this nature is employed at each end of the divided conductor 3.

Under normal conditions the same value of current will flow in each member of the conductor 3, and as a result the windings of the transformer 10 will be held in balance so far as action on the fault relay is concerned, but a current proportional to the total current in the two members of the conductor will flow in the circuit containing the overload relay 16. The overload relay may, of course, be adjusted to operate as is usual in systems employing overload relays only. If, however, a fault occurs which causes a greater current to flow in one conducting member than that in the other conducting member, or should the current reverse in one member as compared with the direction of current flow in the other member, then potential will exist across the terminals of circuit 18, causing current to flow through the circuit 18 containing the fault relay 19, thus closing the circuit 8 and operating the switch 6.

As stated above, my invention is designed to take care of any fault of whatever nature, whether said fault be one involving the two members of the conductor only, or one involving one or both members and another conductor or the ground. By any fault, I mean one which is sufficiently developed to produce actual break down of the insulation, or sufficient deterioration of the insulation to produce unbalanced current flow in the conductor members. In practice certain variations due to commercial usage must be permitted and the intent of the device is to allow for such commercial variations without causing the device to operate. One possible fault is that which would be due to a break down of the insulation between the members of the conductor. In a divided conductor the difference of potential between the conductor members under normal conditions is comparatively low and a heavy insulation is not required. If, however, such insulation should break down at any point, then the two conductor members might become connected at that point. A fault of this nature might not of itself produce sufficient differential current flow in the two primary coils of the balancing transformer to cause the operation of the relay 19 and the isolation of the conductor from the system. In order to produce the necessary differential current flow in the two primary coils of the transformer whenever a fault of the above nature occurs under load conditions, I employ means which normally produce a difference of potential between the two current paths that are connected in parallel, so that whenever a fault occurs involving both conductors, this difference of potential will produce a current flow from one current path to the other thereby causing the required differential current flow in the two primary coils of th, transformer. This difference of potential between the two current paths may be provided for in various ways without departing from the invention. In the construction herein shown I secure this end by employing what I term selector impedances which are associated with the conductor members. These selector impedances are shown at 21 and I propose to employ one in each current path and to place them in that portion of the current path which includes the outer member of the conductor. These impedances are placed one at each end of the conductor and one in each current path, and they have such relative characteristics that they do not under normal conditions disturb the current balance throughout the conductor. Since, however, one of these selector impedances is in one current path at one end of the conductor and the other is in the other current path at the other end of the conductor, it will follow that at any point between the path at the other end of the conductor, it will follow that any point between the two impedances or along the line of the conductor there will be a potential difference between the two conductor members, while at points beyond the impedances or between the impedances and the main buses the potential of the two conductor members or current paths will be the same. In other words, these impedances and their relative positions in the two current paths constitute means at one point of the conductor to produce a potential difference between said conductor members or current paths and means at another point separated from the first point to equalize the potential in said conductor members or current paths beyond such other point. Therefore, the current flowing in both current paths of the divided conductor will have the same potential until one of the impedances is encountered and then from that point until the next impedance is encountered there will be a difference of potential between the currents in the two current paths and at points beyond the second impedance the potential will be equalized again.

As is well known to those skilled in the art the interposition of an impedance containing inductance in a circuit carrying alternating current causes phase displacement, and hence because of the fact that the selector impedances in the two conductor members or current paths are separated from each other in the direction of the length of the conductor, the phase of the potential of one conductor member or current path at any point between said impedances will differ from that of the other conductor member or current path to a degree proportional to the amount of inductance in the said selector impedance, thus producing a potential difference between the currents in said current paths due to difference in phase, said difference of potential coöperating with any difference of potential due to the actual conductor resistance of the selector impedance windings.

These selector reactances or impedances operate as follows: If a fault occurs of any nature which involves both conductor members, the current which flows to the point of fault will become unbalanced or will divide unequally between the two conductor members owing to the fact that one current path to the fault has a selector impedance therein, while the other has only its normal impedance. By the expression "will become unbalanced or will divide unequally" as used in the foregoing, I refer to instantaneous values of the two currents, as it will be apparent to those skilled in the art, that the arithmetical difference between the two currents may in some cases be very small, but due to the effect of the reactive component of the impedance the two currents will differ in phase and therefore will be unbalanced or unequal in instantaneous value. When the above conditions exist, the transformer 10 will be unbalanced, thus causing the circuit 12 to be closed and the switch 6 to be operated. This same action would take place at each end of the cable should current be fed to the fault from both directions. If the fault should be one which involves the two conductor members only, such, for instance, as a break-down of insulation between said conductor members at any point, then there will be a current flow from one conductor member to the other at the point of fault due to the difference of potential between the conductor members, and the transformer 10 will thus become unbalanced thereby operating to disconnect the conductor from the system. This selector impedance is also of great value in case a fault involving the outer member only of a conductor occurs close to one of the buses, particularly when the balancing transformer is one having but little impedance whenever one of its primary coils carries a reverse current with respect to the other. Should a fault of this nature occur without the selector impedance in circuit or without sufficient impedance in the balancing transformer, then the current balance at the distant end of the conductor might not be sufficiently disturbed to produce tripping of the switch at said end while the switch at the end of the conductor adjacent to the fault would be tripped as will be readily seen by reference to the drawings. With my selector impedances connected as shown, one in each current path, combined with any transposition equivalent to that shown which results in both impedances being located in the outer conductor member, the occurrence of a fault adjacent one bus will result in tripping not only the switch 6 at the faulted end of the conductor, but also the switch at the distant end, as current unbalance in the balancing transformer at said distant end will take place due to the fact that one current path to the fault contains both selector impedances associated with the conductor, while the other path to the fault contains substantially no impedance except that of the conductor member itself.

In order to obtain the above protection it is essential that one selector impedance should be placed in each current path and also that the current path should be transposed so as to place both impedances in the outer member, for if both impedances are connected to the inner member and a fault occurs in the outer member adjacent one bus, there will be one impedance in each current path to the fault from the distant end of the conductor and a consequent probability that the transformer at said distant end will not be sufficiently unbalanced to operate; or if there is such an arrangement that the two impedances, one in each current path, are placed one in the outer and one in the inner member, then the operation of the switch at the end of the cable distant from the fault would not be assured if the impedance at said distant end is in the outer member, for in this case also there would be substantially equal impedance in the two current paths to the fault from said distant end.

Another method I employ either separately or in combination with the selector impedance to insure tripping when the fault is near a bus and involves the outer member only, is by use of a balancing transformer device which in connection with a high impedance relay or direct acting trip coil upon current reversal in one conductor member automatically introduces sufficient impedance in one of the current paths from the distant end of the conductor to the fault, thus producing the required unbalance in the balancing transformer at the distant end to cause operation of the switch. This automatic introduction of impedance is due in part to the reversal of the current in one primary coil of the balancing transformer, but more particularly to the effect of a high impedance relay or tripping coil if such is used directly to trip the switch. The action is particularly pronounced when a transformer of the type shown in Fig. 1 is used, as in this case the characteristic of the transformer changes from an open to a closed magnetic circuit type, thus becoming in effect a more powerful transformer capable of generating a greater potential in the secondary coils than under normal conditions even with the same current value in each primary coil. This greater potential permits the use of a tripping coil or relay wound with a high impedance winding which on account of its reaction on the transformer causes substantially an equal amount of impedance to be present in the primary coils, thus choking the current in one path to the fault from the distant end of the conductor and insuring the necessary unbalance in the distant balancing transformer. It must be remembered, however, that if the first switching operation to take place disconnects the conductor from all sources of current supply, the need of unbalanced impedance in the remaining paths to the fault does not exist, and all references to the distant end of the conductor contemplate conditions whereby current can approach the fault from either or both ends of the conductor.

In designing my selector impedances I prefer a characteristic that limits the impedance to a value whereby the potential across the impedance windings does not materially increase with increased current flow over normal, in order that the insulation between the conductor members will not be unduly strained when abnormal current values exist in the conductor from any cause. A convenient method of obtaining this result is by so proportioning the windings and core as will produce saturation of the magnetic circuit approximately at the normal current in the conductor, any increase of current thereafter being of minor effect only.

As stated above, it is not necessary under normal conditions to have a heavy insulation between the inner and outer members of the divided conductors because normally the potential between said members at any point is of low value, being dependent upon the design of the selector impedances. Such comparatively light insulation might, however, be in danger of breaking down in case a fault occurred which developed an unequal current distribution in the two parts of the conductor, and to reduce the tendency to break down, I have provided means to modify the potential existing between the two members of the conductor whenever a fault occurs which produces unequal current flow therein, or when for any other reason unsafe potentials tend to exist at any point between the two members. This means is herein shown in the form of what I have termed a bridging impedance 35 (see Fig. 3) which is connected across the two members of the conductor at one or more points. Whenever there is unequal current flow in the two members of the conductor current will tend to flow from one conductor to the other through the bridging impedance, and as a result the difference in potential between the two conductors is modified or reduced. This bridging impedance is of greater value in systems where the selector impedance is not used, as in such case the potential existing between the conductor members is normally practically nil thereby permitting the use of bridging impedances of low resistance. These bridging impedances also are useful in insuring that excessive potentials shall not exist from causes other than unbalanced current flow as might be the case if transient phenomena such as surges or high frequency oscillations occurred in the system.

In Fig. 2 I have shown another form of balancing transformer embodying my invention. This transformer has the two primary coils 11ª, 12ª, one in each current path, wound in opposition on the same core, and single secondary 13ª, also wound on said core, the secondary being connected to the circuit 18 containing the fault relay 19. Since the primaries are wound in opposition they normally balance each other so that under normal load conditions no current is generated in the secondary. Whenever a fault occurs, however, which produces an unbalanced current condition the relay 19 will be actuated to operate the switch 6, as will be obvious.

In order that the divided conductor may be tested for integrity of separator insulation and continuity of conductor members when the said conductor is dead or out of service, or alive but carrying current of little value, I make use of a device for producing unbalanced current flow in the conductor members from terminal to terminal. A convenient method is shown in Fig. 1 and consists of a circuit connection 44 by which an alternating current can be impressed on the balancing transformer secondaries 13, 14 at one end of the conductor. This impressed current by direct action on the relay at said end, and by transformer action on the primary coils 11, 12 at said end produces action of the relay, and also induces a circulating current in the conductor members which at the opposite end of the conductor produces by transformer action current in the distant transformer secondaries with consequent action of the distant relay. Should this action not occur at both ends of the conductor it would indicate a fault in the insulation between the conductor members or an open circuit in one of the conductor members. The selector impedances above described, however, automatically indicate such faults should the cable be alive and carrying current.

By the expression "establishing an electric contact" as employed in some of the claims, I intend to refer to the existence of such a condition which will permit current to flow from one conductor member to the other such as would be caused by either a complete or partial break-down in the insulation between the conductor members.

While I have illustrated herein some embodiments of my invention I do not wish to be limited to the particular construction shown.

Having described my invention, what I claim as new and desire to secure by Letters Patent is:—

1. In a system of electrical distribution, the combination with a divided conductor extending between two receiving or distributing points and having the two legs thereof insulated from each other but connected in parallel, of means for disconnecting said conductor from the system and devices to render said means operative whenever the insulation between said legs breaks down at any point in the length of the conductor sufficiently to permit a current flow between them.

2. In a system of electrical distribution, the combination with a divided conductor connecting two receiving or distributing points and having the two members thereof insulated from each other but connected in parallel, of means to cause an unbalanced current flow in the two members whenever the insulation between said members breaks down at any point sufficiently to permit a current to flow between said members, and means operated by said unbalanced current flow to isolate the conductor from the system.

3. In a system of electrical distribution, the combination with a divided conductor connecting two receiving or distributing points and provided with two current paths connected in parallel but insulated from each other, of a selector-impedance in each current path arranged to cause an unbalanced current flow in said paths whenever the insulation between said paths breaks down at any point sufficiently to form an electrical contact between said paths, and means operated by said unbalanced current flow to isolate said conductor.

4. In a system of electrical distribution, the combination with a divided conductor connecting two receiving or distributing points and provided with two current paths connected in parallel but insulated from each other, of a selector-impedance in each current path, one situated at one end of the conductor and the other at the other end and arranged to cause an unbalanced current flow in said paths whenever the insulation between said paths breaks down at any point sufficiently to permit a current flow between said paths, and means operated by said unbalanced current flow to isolate said conductor.

5. In a system of electrical distribution, the combination with parallel connected current paths extending between two receiving or distributing points, of a selector-impedance in each current path arranged to cause an unbalanced current flow in said paths whenever a fault occurs which involves both current paths, and means rendered operative by said unbalanced current flow to disconnect said current paths from the system.

6. In a system of electrical distribution, the combination with a divided conductor extending between two receiving or distributing points and comprising working conductor members connected in parallel and insulated from each other and one situated within the other, of means for isolating said conductor from the system whenever a fault occurs resulting in a current flow from one conductor member to the other at the point of fault.

7. In a system of electrical distribution, the combination with a divided conductor extending between two receiving or distributing points and comprising working conductor members carrying current of the same phase or polarity and insulated from each other and one inclosing the other, of means to cause unbalanced current flow in said members whenever a fault occurs which results in the establishment of a current flow between said members intermediate of their ends, and means operated by said unbalanced current flow to isolate said conductor from the system.

8. In a system of electrical distribution, the combination with a divided conductor extending between two receiving or distributing points and providing current paths insulated from each other but connected in parallel, one current path inclosing the other, of a selector-impedance in each current path arranged to cause an unbalanced current flow therein whenever a fault occurs which results in establishing an electrical contact between said current paths, and means operated by said unbalanced current flow to isolate the conductor from the system.

9. In a system of electrical distribution, the combination with a divided conductor extending between two receiving or distributing stations and presenting two conductor members which provide two current paths, one conductor member being situated within the other and the inner and outer members being transposed at one point at least in the length of the conductor whereby each of the current paths is partially formed by an inner member and partially formed by an outer member, of means to isolate said conductor from the system whenever a fault occurs therein.

10. In a system of electrical distribution, the combination with a divided conductor extending between two receiving or distributing stations and presenting two conductor members, one situated within the other and with the inner and outer members transposed at one point at least in the length of the conductor whereby each of the two current paths provided by the two conductor members is partially formed by an inner member and partially formed by an outer member, of a selector-impedance in that portion of each current path constituting an outer conductor member whereby an unbalanced current flow will be produced in said current paths upon the occurrence of a fault involving both conductor members, and means operated by said unbalanced current flow to isolate the conductor from the system.

11. In a system of electrical distribution, the combination with a divided conductor having concentrically-arranged members thereby providing two current paths, said conductor having means to balance the impedances in the parallel current paths, of means for causing an unbalanced current flow in said current paths whenever a fault occurs involving both conductor members, and means operated by said unbalanced current flow to isolate the conductor from the system.

12. In an electrical distributing system, the combination with two parallel-connected conducting members connecting two receiving or distributing points, of means for disconnecting said members from the system and devices rendered operative by a fault involving both conducting members for actuating said means.

13. In an electrical distributing system, the combination with a divided conductor connecting two receiving or distributing points and provided with current paths connected in parallel but insulated from each other, of means for disconnecting said conductor from the system and devices operated by a fault involving both current paths to actuate said means.

14. In a system of electrical distribution, the combination with two conducting members extending between two receiving or distributing points and connected in parallel, of a balancing transformer having a primary winding connected to each conducting member and provided with two secondary windings, one associated with each primary winding, two operating coils, said secondaries being connected in series with one coil and in multiple with the other coil whereby an unequal current flow in the two conducting members will operatively energize one coil and an excess current flow in a normal direction will operatively energize the other coil, and means operated by said coils for disconnecting the conducting members from the system.

15. In a system of electrical distribution, the combination with a divided conductor connecting two receiving or distributing points and provided with two current paths connected in parallel but insulated from each other, of a balancing transformer having a primary winding in each path and provided with two secondary windings, two operating coils, the secondary windings being connected in series with one coil and in multiple with the other coil whereby an unequal current flow in the two conductors will operatively energize one coil and an excess current flow in a normal direction will operatively energize the other coil, and means actuated by said coils for disconnecting said conductor from the system.

16. In a system of electrical distribution, the combination with a divided conductor connecting two receiving or distributing points and provided with two current paths connected in parallel but insulated from each other, of means to modify the potential tending to exist across the insulation between said paths whenever a fault occurs which develops a greater current flow in one than in the other.

17. In a system of electrical distribution, the combination with a divided conductor connecting two receiving or distributing points and provided with two current paths connected in parallel but insulated from each other, of a bridging impedance connected across said path whereby the potential tending to exist between them will be modified whenever a fault occurs which develops a greater current flow in one than in the other.

18. In a system of electrical distribution, the combination with a divided conductor extending between two receiving or distributing stations and presenting inner and outer conductor members which are transposed at at least one point in the length of the conductor thereby providing two current paths, each of which is partially formed by an inner member and partially formed by an outer member, of a selector-impedance at each end of the conductor and in that portion of each current path constituting an outer conductor member whereby an unbalanced current flow will be produced in said current paths at both ends of the conductor upon the occurrence of a fault, and means operated by said unbalanced current flow to disconnect both ends of the conductor from the system.

19. In a system of electrical distribution, the combination with two parallel connected conductor members extending between two receiving or distributing stations, of a balancing transformer having two primaries, one connected to each conductor member, a high impedance switch-actuating coil connected to the secondary of the transformer whereby when a fault occurs in one conductor member adjacent the bus so that a reverse current will be established in one primary the high impedance of the coil will react on the transformer thereby developing impedance in said primaries which produces an unequal current flow to the fault from the opposite end of the conductor through said two conductor members, and means operated by said unequal current flow to disconnect said opposite end of the conductor from the system.

20. In a system of electrical distribution, the combination with a divided conductor extending between two receiving or distributing stations and presenting inner and outer conductor members which are transposed at at least one point in the length of the conductor thereby providing two current paths, each of which is partially in one member and partially in the other, of a selector impedance at each end of the conductor, said impedances being placed one in one current path and one in the other whereby an unbalanced current flow will be produced in said current paths upon the occurrence of a fault, and means operated by said unbalanced current flow to disconnect the conductor from the system.

21. In a system of electrical distribution, the combination with two conducting members connected in parallel and extending between two receiving or distributing points, of a balancing transformer at each end of the pair of conducting members, each transformer having two primaries, one connected to each conducting member, an operating coil connected to the secondary, means actuated by the operating coil when energized to disconnect the conducting members from the system, and means to impress on the secondary of the transformer at one end an alternating current whereby through transformer action a circulating current is generated in the conducting members in opposite directions, which circulating current re-acts on the transformer at the opposite end of the conducting members to cause the corresponding operating coil to be energized in case the conducting members are not involved in a fault affecting the insulation between said members or the continuity of said members.

22. In a system of electrical distribution, the combination with two conductor members connected in parallel and extending between two receiving or distributing points, of a balancing transformer having two primaries, one connected to each conductor member, an operating coil connected to the secondary, means actuated by the operating coil when energized to disconnect the conductor members from the system, and means inductively related to the conductor members to induce in said members a circulating current, which circulating current reacts on the transformer at the opposite end of the conductor members by which the continuity of said members and the condition of insulation between them can be tested.

23. In a system of electrical distribution, the combination with two conductor members connected in parallel and extending between two receiving or distributing points, of means to produce under normal working conditions a potential difference between said conductor members, and means to isolate said conductor members from the system whenever a fault occurs involving both members.

24. In a system of electrical distribution, the combination with two conductor members connected in parallel and extending between two receiving or distributing points, of a balancing transformer having two primaries, one connected to each conductor member, means operated by said transformer when the latter is unbalanced to isolate the conductor members from the system, and means to produce under normal working conditions a potential difference between the conductor members without however unbalancing the transformers.

25. In a system of electrical distribution, the combination with two conductor members connected in parallel and extending between two receiving or distributing points, of a balancing transformer having two primaries, one connected to each conductor member, means operated by said transformer when the latter is unbalanced to isolate the conductor members from the system, and means to produce under normal working conditions a potential difference between the conductor members sufficient to cause a differential current flow in said members such as to unbalance the transformer whenever a fault occurs involving both conductor members without however causing the transformer to be unbalanced under normal working conditions.

26. In an electrical distributing system, the combination with a divided conductor connecting two receiving or distributing points and provided with two current paths connected in parallel but insulated from each other, means to produce under normal working conditions a potential difference between said two current paths and means to reduce the tendency for unsafe potential to develop or exist between said paths at any point between their extremities.

27. In an electrical distributing system, the combination with two conductor members connected in parallel and extending between two receiving or distributing points, of means to produce under normal working conditions a potential difference between said conductor members without however producing a difference of current flow, and means to isolate said conductor members from the system whenever a fault occurs involving both members.

28. In a system of electrical distribution, the combination with a divided conductor extending between two receiving or distributing points and comprising two conductor members connected in parallel, of means at one point of said conductor to produce a difference of potential between said conductor members, means at another point separated from the first point to equalize the potential in said conductor members beyond such other point and means to disconnect the conductor from the system whenever a fault occurs involving both conductor members.

In testimony whereof, I have signed my name to this specification, in the presence of two subscribing witnesses.

WILLIAM H. COLE.

Witnesses:
BERTHA F. HEUSER,
THOMAS J. DRUMMOND.

Copies of this patent may be obtained for five cents each, by addressing the "Commissioner of Patents, Washington, D. C."

It is hereby certified that in Letters Patent No. 1,152,881, granted September 7, 1915, upon the application of William H. Cole, of Waltham, Massachusetts, for an improvement in "Systems of Electrical Distribution," errors appear in the printed specification requiring correction as follows: Page 2, line 62, for the word "relav" read *relay;* page 3, strike out lines 26–27; page 6, lines 1–2, for the words "a selector-impedance" read *an impedance device;* and that the said Letters Patent should be read with these corrections therein that the same may conform to the record of the case in the Patent Office.

Signed and sealed this 5th day of October, A. D., 1915.

[SEAL.]

R. F. WHITEHEAD,
*Acting Commissioner of Patents.*